Patented Feb. 24, 1948

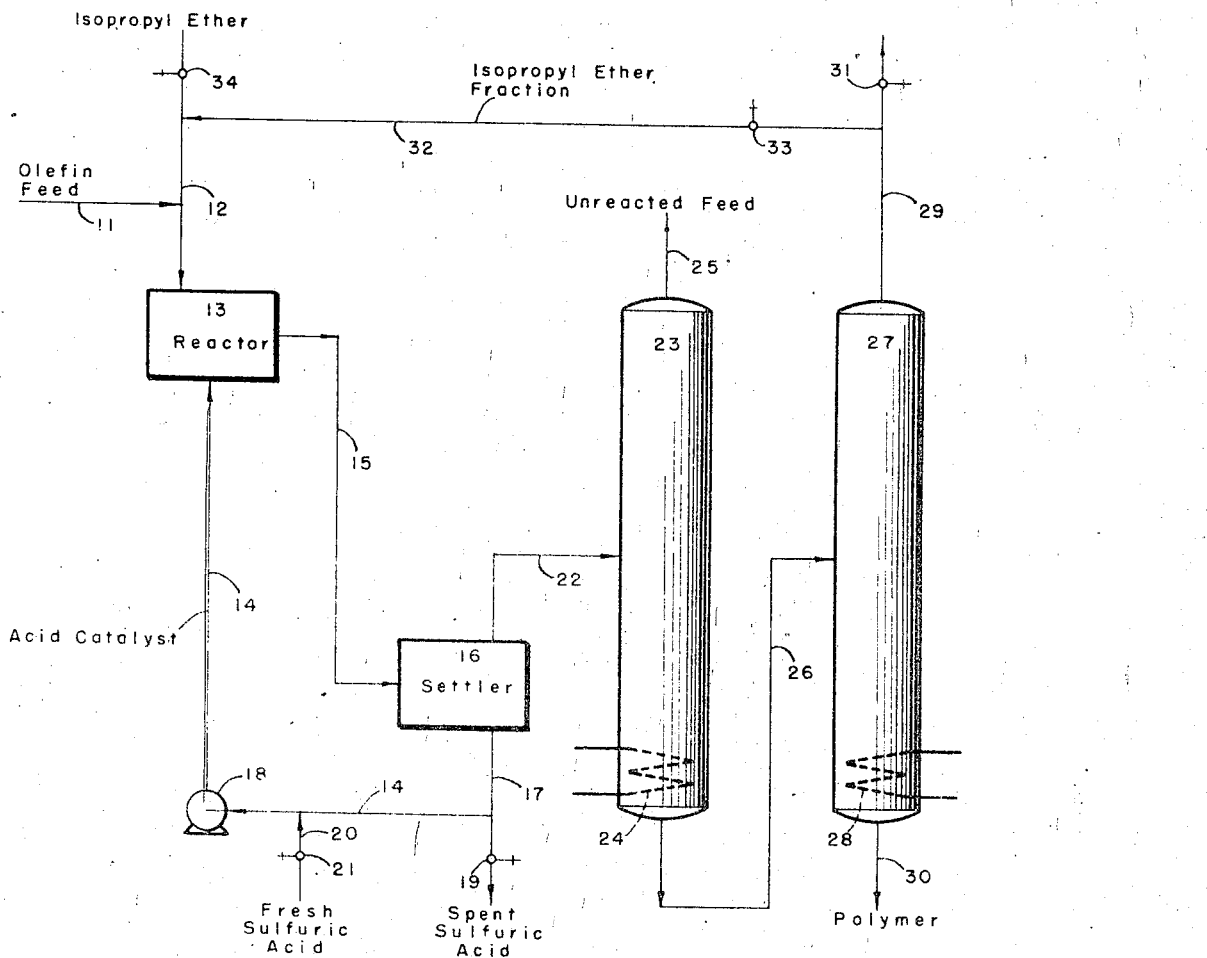

2,436,571

UNITED STATES PATENT OFFICE 2,436,571

POLYMERIZATION OF OLEFINS

Raymond L. Heinrich, Baytown, Tex., assignor to Standard Oil Development Company, a corporation of Delaware Application December 8, 1945, Serial No. 633,819

4 Claims. (Cl. 260—683.15)

The present invention is directed to a process for polymerizing olefins. More particularly, it is directed to the polymerization of mixtures of olefins in the presence of sulfuric acid in which propylene is one of the olefinic constituents of the mixture.

Prior to the present invention, it has been known to react mono-olefins with sulfuric acid of a strength between 60% and 85% to produce polymers which are employed as motor fuels or addition agents therefor. The prior art describes various methods for polymerizing the mono-olefins, including propylene, in the presence of sulfuric acid. Such prior art processes for polymerizing olefinic materials containing propylene have a great disadvantage in that appreciable quantities of isopropyl ether are produced along with the desirable polymers. It has not been known heretofore to control or direct the reaction so that the polymer was formed exclusive of the isopropyl ether.

One method of the prior art has involved the hydrolyzing of the isopropyl sulfate built up in the acid catalyst or hydrocarbon reactants to isopropyl ether which is subsequently separated from the reaction product and then reblended with the hydrogenated polymer as may be desired. It will be recognized by the skilled worker that such a prior art process of removing isopropyl ether from the reaction product entails a great loss in the desirable olefinic material which is degraded to isopropyl ether and also causes the operator to suffer an additional loss in the desirable properties of his motor fuel since it is well recognized that the ethers have a lower heating value than the saturated paraffins.

Isopropyl ether is one of the major products of the reaction of propylene with butylenes or pentylenes in the presence of strong sulfuric acid (60% to 85% by weight) to form olefins of higher molecular weight than pentylene. The isopropyl ether is formed under the same conditions, 140° to 180° F., 100 to 300 p. s. i. g., and 5 to 30 minutes reaction time, as those required for the copolymerization of the olefins. The formation of the isopropyl ether takes place through the following chemical reactions:

$$CH_3-CH=CH_2 + H_2SO_4 \longrightarrow CH_3-CH-CH_3$$
$$\qquad\qquad\qquad\qquad\qquad\qquad\qquad |$$
$$\qquad\qquad\qquad\qquad\qquad\qquad\quad HSO_4$$

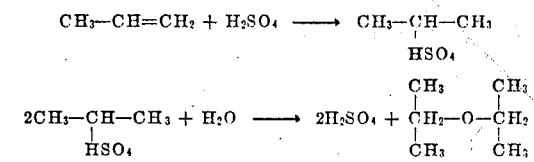

Isopropyl ether is an undesirable product in the copolymerization reaction since the conversion of the propylene to liquid hydrocarbons for use in fuels is desired and present fuel specifications do not permit inclusion of isopropyl ether. The products of several typical copolymerization reactions are as follows:

| Olefins in charge | Propylene and Pentylenes | Propylene and Isobutylene |
|---|---|---|
| Temp. of reaction, °F | 181 | 175 |
| Pressure, p. s. i. g | 181 | 220 |
| Time, Mins | 20 | 30 |
| Catalyst | 70% $H_2SO_4$ | 70% $H_2SO_4$ |
| Composition of product boiling above 125 °F., Volume per cent: | | |
| Isopropyl ether | 11 | 4 |
| Polymer | 89 | 96 |

It has been observed that in the polymerization of propylene with pentylenes and butylenes, the amount of isopropyl ether produced increases as the catalyst is used over and over. When conducting such reactions it is customary to separate the product from the catalyst, distill the product and use the catalyst for polymerizing additional amounts of olefinic material. Every time the catalyst goes through the reaction cycle, the amount of isopropyl ether formed increases as formed increases as shown by the following data:

| Olefins in charge | Propylene and Pentylenes | Propylene and Isobutylene |
|---|---|---|
| Isopropyl ether in product boiling above 125° F., Vol. per cent: | | |
| First time catalyst used | 12 | 2 |
| Second time catalyst used | 16 | 12 |
| Third time catalyst used | 47 | 20 |
| Fourth time catalyst used | | 28 |

Thus, it will be evident that the amount of ether formed becomes a considerable liability in the polymerization process when the catalyst is used for any length of time corresponding with that necessary for economical commercial operation of the process. In any event, the olefinic material is lost as isopropyl ether. Further, the acid becomes increasingly stronger as the reaction proceeds by virtue of the fact that isopropyl ether takes away water from the catalyst as oxygen in the formation of the ether and, due to the increase in the acid strength, the etherification reaction, rather than the polymerization reaction, becomes the predominant reaction.

In accordance with the present invention, formation of isopropyl ether in the polymerization of olefins, in which propylene is one constituent, is suppressed by maintaining in the reaction zone a quantity of isopropyl ether sufficient to inhibit or suppress the formation of additional amounts of isopropyl ether. This may be accomplished by including in the feed hydrocarbons the proper amount of isopropyl ether obtained from any source, or it may be accomplished by separating the isopropyl ether from the reaction product and recycling all or part of the isopropyl ether to the reaction zone. Ordinarily it will be necessary to maintain approximately 5% to 15% of isopropyl ether in the reaction zone to suppress formation of additional quantities of isopropyl ether. Maintenance of the content of the isopropyl ether in the reaction zone between the limits mentioned before maintains the acid strength at a point conducive to the polymerization reaction.

In practicing the present invention, the olefinic feed may include propylene and pentylenes or propylene and butylenes and paraffinic hydrocarbons of about the same boiling point as the olefins. Insofar as the reaction is concerned, the paraffinic hydrocarbons are inert and serve only as diluents in the reaction zone. The olefinic materials may be used in purified form, but in commercial operations it is unlikely that they will be available except in admixture with the paraffins of the same number of carbon atoms.

The strength of the sulfuric acid employed in the process of the present invention will vary from about 60% to 85% $H_2SO_4$. Ordinarily, an acid of the strength of about 70% will be employed and best operations are usually obtained with acid in the range from 60 to 70% strength.

The temperature at which the reaction zone is maintained will vary from about 140° F. to about 200° F. Higher temperatures may be used up to about 225° F., but ordinarily the lower ranges in the neighborhood of 180° F. will be preferred.

The hydrocarbons and the acid catalyst may be contacted in any suitable equipment such as time tanks, incorporators, centrifugal pumps, towers with internal arrangements which include distributing means which insure proper contact between the reaction materials, and in any one of the numerous mixing or incorporating devices available in the industry. It is important that a molecule of the propylene be available for reaction with at least one molecule of the other olefinic constituents of the mixture. Any apparatus which insures this contact in the presence of the catalyst may be employed.

The nature and objects of the present invention will be better understood by reference to the single figure which is in the form of a diagrammatic flow sheet.

Referring now to the drawing, numeral 11 designates a feed line through which an olefinic mixture, including propylene and, for purpose of illustration, pentylenes, is introduced into the system. The olefinic mixture flows through line 11 into line 12 and thence into a reaction zone 13, where the olefinic hydrocarbons come into contact with sulfuric acid of about 70% strength introduced by way of line 14. Zone 13 is provided with conventional mixing and other auxiliary equipment, not shown, to insure intimate contact of the olefins with the acid catalyst. Ordinarily the time for substantial completion of the reaction will vary from about 5 to 30 minutes and zone 13 should have capacity to allow such a residence time of the reactants therein.

The reactants, including the acid catalyst, discharge from zone 13 by way of line 15 into a settling zone 16 where a hydrocarbon phase and an acid phase separate under the influence of gravity. The acid phase is discharged from separator 16 by way of line 17 and is recycled to the system through line 14 and pump 18.

Line 17 is provided with a valve 19 through which spent acid may be withdrawn from the system to maintain the acid strength at an optimum level. Connecting to line 14 is a line 20 controlled by valve 21 through which fresh sulfuric acid in an amount equivalent to the amount withdrawn by line 19 may be introduced to compensate for the acid which may be discharged from time to time.

The hydrocarbon phase separated in zone 16 is withdrawn therefrom by way of line 22 and is discharged into a fractionation zone 23 which is provided with a heating means 24 for adjustment of temperature and pressure, a line 25 and a second line 26. In fractionation zone 23, conditions are adjusted to remove an overhead through line 25. If the reaction has not gone to completion, the overhead will include unreacted hydrocarbons, which may be recycled to zone 13 but, ordinarily, it will be undesirable to recycle the hydrocarbon withdrawn by way of line 25 to the reaction zone.

The stream withdrawn from zone 23 by line 26 debouches into a second fractionation zone 27 which, similar to fractionation zone 23, is provided with a heating means 28, an overhead line 29 and a bottoms line 30. The conditions are maintained in zone 27 by heating means 28 to remove as overhead through line 29 a fraction consisting primarily of isopropyl ether and to discharge as bottoms through line 30 the polymerized product which may be subjected to additional fractionation and treatment as desired. Ordinarily, the materials discharged by line 30 will be treated with an alkaline reagent under hydrolyzing conditions to remove acidic materials which may have carried over from the settler 16 or which may remain in solution in the polymer. Line 29 is provided with a valve 31 for discharge of isopropyl ether if desired. Connecting to line 29 is a branch line 32 which connects to line 12 to allow recycle of all or part of the isopropyl ether to line 12 by manipulation of valve 33. Line 12, to which branch line 32 connects, is equipped with a valve 34 through which isopropyl ether from an extraneous source may be introduced to maintain a proper concentration in the reaction zone.

If desired the isopropyl ether discharged from zone 27 by line 29 may be removed from the system and further purified by distillation to remove the small amount of olefinic material which may be contained therein. It will be seen from the foregoing data that considerable quantities of isopropyl ether may become available for discharge from the system above that required to maintain a proper concentration of isopropyl ether in the reaction zone.

The nature and objects of the present invention having been fully described and illustrated, what I wish to claim as new and useful and to secure by Letters Patent is:

1. A method for reacting an olefinic mixture comprising propylene and a mono-olefin having a greater number of carbon atoms than propylene in a reaction zone in the presence of sulfuric acid having a strength within the range of 60% to 85%, which includes the steps of contacting said olefinic mixture with sulfuric acid in the reaction zone in the presence of isopropyl ether in an amount within the range of 5% and 15% by volume, separating a hydrocarbon phase from an acid phase, fractionating the hydrocarbon phase into an ether fraction and a polymer fraction, and employing at least a portion of said ether fraction to maintain the amount of isopropyl ether in the reaction zone within the range of 5% and 15% by volume.

2. A method in accordance with claim 1 in which the second mono-olefin has four carbon atoms.

3. A method in accordance with claim 1 in which the second mono-olefin has five carbon atoms.

4. A process for polymerizing propylene with a mono-olefin having four to five carbon atoms in the molecule which includes the steps of forming a mixture of propylene, a mono-olefin having four to five carbon atoms in the molecule, and isopropyl ether, contacting said mixture with sulfuric acid having a concentration within the range of 60% to 85% in a reaction zone maintained at a temperature within the range of approximately 140° to 200° F. and at a pressure sufficient for liquid phase operation, removing a reaction product from said reaction zone, separating the reaction product into a hydrocarbon phase and an acid phase, distilling the hydrocarbon phase to obtain an isopropyl ether fraction and a polymer fraction, and returning at least a portion of the isopropyl ether fraction to the reaction zone to maintain a concentration of isopropyl ether in the reaction zone within the range of 5% to 15% by volume of the total hydrocarbons in the reaction zone.

RAYMOND L. HEINRICH.

REFERENCES CITED

The following references are of record in the file of this patent:

UNITED STATES PATENTS

| Number | Name | Date |
| --- | --- | --- |
| 2,314,457 | Roetheli et al. | Mar. 23, 1943 |
| 2,255,275 | Stahly | Sept. 9, 1941 |